(12) United States Patent
Natu et al.

(10) Patent No.: US 11,366,605 B2
(45) Date of Patent: Jun. 21, 2022

(54) STORAGE MANAGEMENT SYSTEM AND METHOD FOR STORAGE MIGRATION SERVICES

(71) Applicant: EMC IP Holding Company, LLC, Hopkinton, MA (US)

(72) Inventors: Gajanan S. Natu, Cary, NC (US); Kenneth Hu, Lexington, MA (US); Susan Rundbaken Young, Needham, MA (US)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 26 days.

(21) Appl. No.: 16/670,928

(22) Filed: Oct. 31, 2019

(65) Prior Publication Data

US 2021/0132853 A1 May 6, 2021

(51) Int. Cl.
*G06F 3/06* (2006.01)
(52) U.S. Cl.
CPC .......... *G06F 3/0653* (2013.01); *G06F 3/0604* (2013.01); *G06F 3/0679* (2013.01); *G06F 3/0689* (2013.01)
(58) Field of Classification Search
CPC .... G06F 3/0653; G06F 3/0689; G06F 3/0604; G06F 3/0679
See application file for complete search history.

(56) References Cited

U.S. PATENT DOCUMENTS

| | | | | |
|---|---|---|---|---|
| 5,513,336 A | * | 4/1996 | Vishlitzky | G06F 12/0862 711/113 |
| 8,800,009 B1 | * | 8/2014 | Beda, III | H04L 63/0846 726/6 |
| 10,642,505 B1 | * | 5/2020 | Kuzmin | G06F 3/0685 |
| 2010/0332401 A1 | * | 12/2010 | Prahlad | H04L 63/0428 705/80 |
| 2015/0347430 A1 | * | 12/2015 | Ghosh | G06F 11/1451 707/649 |
| 2015/0370428 A1 | * | 12/2015 | Chan | G06F 3/04842 715/739 |
| 2017/0279735 A1 | * | 9/2017 | Yousaf | G06F 9/5083 |
| 2018/0287902 A1 | * | 10/2018 | Chitalia | H04L 43/045 |

* cited by examiner

*Primary Examiner* — Jerome Leboeuf

(74) *Attorney, Agent, or Firm* — Brian J. Colandreo; Mark H. Whittenberger; Holland & Knight LLP

(57) ABSTRACT

A method, computer program product, and computing system for detecting a data location event concerning a data storage system; holistically analyzing the data storage system to determine a status for the data storage system; and generating one or more recommendations concerning the data location event based, at least in part, upon the status for the data storage system.

20 Claims, 3 Drawing Sheets

STORAGE MANAGEMENT SYSTEM AND METHOD FOR STORAGE MIGRATION SERVICES

TECHNICAL FIELD

This disclosure relates to storage management processes and, more particularly, to storage management processes for use in high-availability storage systems.

BACKGROUND

Storing and safeguarding electronic content is of paramount importance in modern business. Accordingly, various methodologies may be employed to protect and distribute such electronic content, wherein the storage systems that process such content may strive to do so in as an efficient manner as possible. Unfortunately and due to the complexity of such storage systems, tasks that are simple on their face may have unexpected consequences if implemented unchecked.

SUMMARY OF DISCLOSURE

In one implementation, a computer-implemented method is executed on a computing device and includes: detecting a data location event concerning a data storage system; holistically analyzing the data storage system to determine a status for the data storage system; and generating one or more recommendations concerning the data location event based, at least in part, upon the status for the data storage system.

One or more of the following features may be included. The one or more recommendations may be provided to a user for approval. The one or more recommendations may be automatically implemented. The data location event may be the result of one or more of: a user request; and a detected condition within the data storage system. The data location event may concern one or more of: a change in storage capacity within the data storage system; and a movement of data within the data storage system. The one or more recommendations may concern one or more of: the location of new data within the data storage system; and the relocation of existing data within the data storage system. The computer-implemented method of claim 1 wherein holistically analyzing the data storage system to determine a status for the data storage system includes one or more of: analyzing user-defined constraints; analyzing CPU utilization; analyzing storage utilization; analyzing IOPs; analyzing network utilization; and analyzing RANI utilization.

In another implementation, a computer program product resides on a computer readable medium and has a plurality of instructions stored on it. When executed by a processor, the instructions cause the processor to perform operations including: detecting a data location event concerning a data storage system; holistically analyzing the data storage system to determine a status for the data storage system; and generating one or more recommendations concerning the data location event based, at least in part, upon the status for the data storage system.

One or more of the following features may be included. The one or more recommendations may be provided to a user for approval. The one or more recommendations may be automatically implemented. The data location event may be the result of one or more of: a user request; and a detected condition within the data storage system. The data location event may concern one or more of: a change in storage capacity within the data storage system; and a movement of data within the data storage system. The one or more recommendations may concern one or more of: the location of new data within the data storage system; and the relocation of existing data within the data storage system. The computer-implemented method of claim 1 wherein holistically analyzing the data storage system to determine a status for the data storage system includes one or more of: analyzing user-defined constraints; analyzing CPU utilization; analyzing storage utilization; analyzing IOPs; analyzing network utilization; and analyzing RANI utilization.

In another implementation, a computing system includes a processor and memory is configured to perform operations including: detecting a data location event concerning a data storage system; holistically analyzing the data storage system to determine a status for the data storage system; and generating one or more recommendations concerning the data location event based, at least in part, upon the status for the data storage system.

One or more of the following features may be included. The one or more recommendations may be provided to a user for approval. The one or more recommendations may be automatically implemented. The data location event may be the result of one or more of: a user request; and a detected condition within the data storage system. The data location event may concern one or more of: a change in storage capacity within the data storage system; and a movement of data within the data storage system. The one or more recommendations may concern one or more of: the location of new data within the data storage system; and the relocation of existing data within the data storage system. The computer-implemented method of claim 1 wherein holistically analyzing the data storage system to determine a status for the data storage system includes one or more of: analyzing user-defined constraints; analyzing CPU utilization; analyzing storage utilization; analyzing IOPs; analyzing network utilization; and analyzing RANI utilization.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
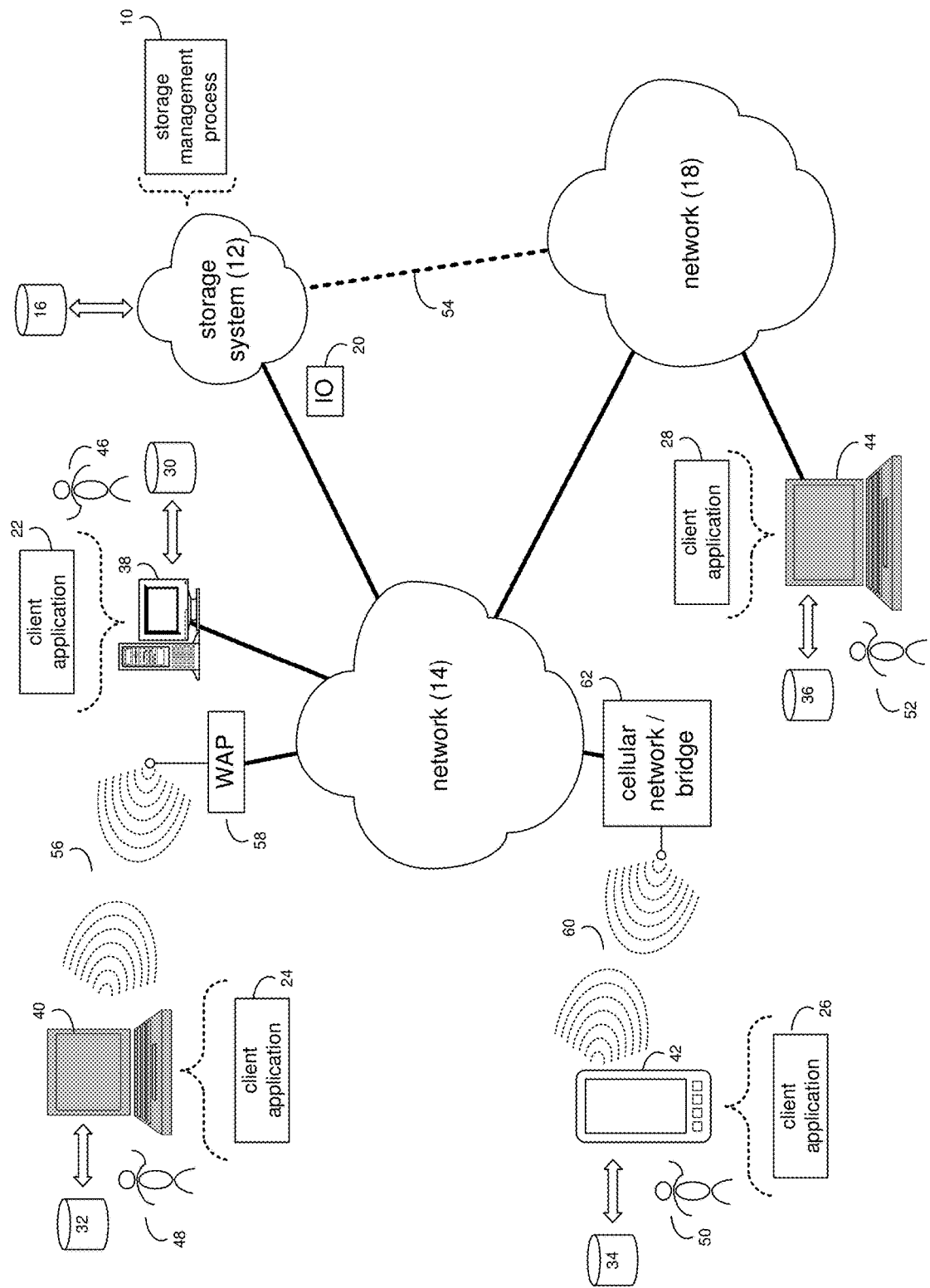
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a personal computer with a memory system, a server computer with a memory system, a Network Attached Storage (NAS) system, a Storage Area Network (SAN) and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™, Redhat Linux™, Unix, or a custom operating system, for example.

The instruction sets and subroutines of storage management process 10, which may be stored on storage device 16 coupled to storage system 12, may be executed by one or more processors (not shown) and one or more memory architectures (not shown) included within storage system 12. Storage device 16 may include but is not limited to: a hard disk drive; an optical drive; a RAID device; a random access memory (RANI); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

Figure 2:
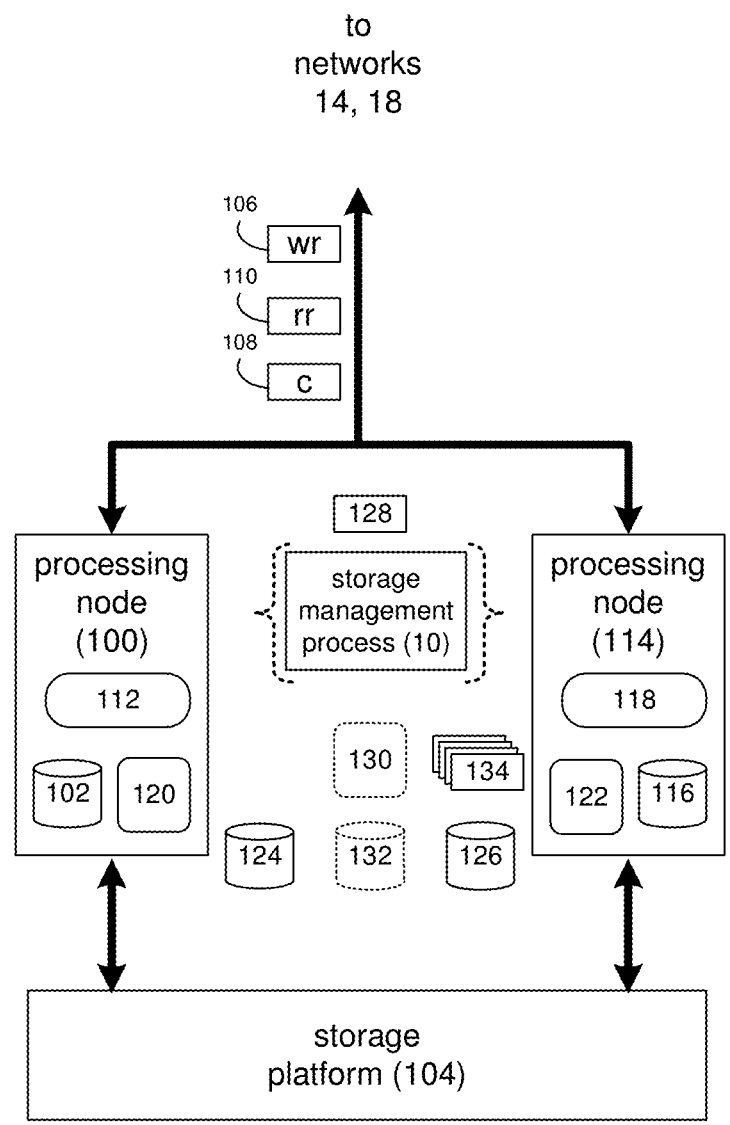
FIG. 2 is a diagrammatic view of the storage system of FIG. 1.

The Data Storage System:

Referring also to FIG. 2, there is shown a general implementation of storage system 12. In this general implementation, storage system 12 may include processing node 100. An example of processing node 100 may include but is not limited to a storage appliance (e.g., a storage device, an NAS device or discrete devices within an SAN). As is known in the art, a storage appliance is a type of computing appliance that provides data to (or manages data for) other network-connected computing devices. Processing node 100 may be configured to perform computational tasks and may be configured to store data locally (on local storage 102) or within storage platform 104.

Depending upon the manner in which storage system 12 is configured, storage platform 104 may include a single storage device (such as a single hard disk drive or a single solid state storage device) or may include a plurality of storage devices that are configured to provide various levels of performance and/or high availability. For example and if storage platform 104 includes a plurality of storage devices (e.g., hard disk drives and/or solid state storage devices), this plurality of storage devices may be configured to form a RAID storage array utilizing various standard RAID structures (e.g., RAID 0, RAID 1, RAID 3, RAID 5, RAID 6, RAID 7 or RAID 10), thus providing a higher level of performance and/or availability.

Storage system 12 may be configured to execute all or a portion of storage management process 10. The instruction sets and subroutines of storage management process 10, which may be stored on a storage device (e.g., storage device 102) coupled to e.g., processing node 100, may be executed by one or more processors (not shown) and one or more memory architectures (not shown) included within processing node 100. Storage device 102 may include but is not limited to: a hard disk drive; a RAID device; a random access memory (RAM); a read-only memory (ROM); and all forms of flash memory storage devices.

As discussed above, various TO requests (e.g. TO request 20) may be generated. For example, these TO requests may be sent from client applications 22, 24, 26, 28 to storage system 12. Additionally/alternatively and when storage system 12 is configured as an application server, these TO requests may be internally generated within storage system 12. Examples of TO request 20 may include but are not limited to data write request 106 (i.e. a request that content 108 be written to storage system 12) and data read request 110 (i.e. a request that content 108 be read from storage system 12).

During operation of processing node 100, content 108 to be written to storage system 12 may be processed by processing node 100. Additionally/alternatively and when storage system 12 is configured as an application server, content 108 to be written to storage system 12 may be internally generated by processing node 100.

Processing node 100 may include cache memory system 112. Examples of cache memory system 112 may include but are not limited to a volatile, solid-state, cache memory system (e.g., a static RAM cache memory system) and/or a non-volatile, solid-state, cache memory system (e.g., a flash-based, cache memory system). Processing node 100 may initially store content 108 within cache memory system 112. Depending upon the manner in which cache memory system 112 is configured, processing node 100 may immediately write content 108 to local storage 102 or storage platform 104 (if cache memory system 112 is configured as a write-through cache) or may subsequently write content 108 to local storage 102 or storage platform 104 (if cache memory system 112 is configured as a write-back cache).

Storage system 12 may be configured to include a plurality of processing nodes, each of which may be configured to receive, generate and/or process content (e.g., content 108). For example and in addition to processing node 100, storage system 12 may include one or more additional processing nodes (e.g., processing node 114). An example of processing node 114 may include a storage appliance (e.g., a storage device, an NAS device or discrete devices within an SAN). Processing node 114 may be configured to perform computational tasks and may be configured to store data locally (on local storage 116) or within storage platform 104.

Processing node 114 may include cache memory system 118. Examples of cache memory system 118 may include but are not limited to a volatile, solid-state, cache memory system (e.g., a static RAM cache memory system) and/or a non-volatile, solid-state, cache memory system (e.g., a flash-based, cache memory system). Processing node 114 may initially store content 108 within cache memory system 118. Depending upon the manner in which cache memory system 118 is configured, processing node 114 may immediately write content 108 to local storage 116 or storage platform 104 (if cache memory system 118 is configured as a write-through cache) or may subsequently write content 108 to local storage 116 or storage platform 104 (if cache memory system 118 is configured as a write-back cache).

One or more of processing nodes 100, 114 may be configured to execute one of more virtual machines. For example, virtual machine 120 may be executed on processing node 100 and/or virtual machine 122 may be executed on processing node 114).

As is known in the art, a virtual machine (VM) may be an emulation of a computer system. Virtual machines may be based on computer architectures and may provide the functionality of a physical computer. The implementation of these virtual machines may involve specialized hardware, software, or a combination of both.

There are different kinds of virtual machines, each with different functionality:

System Virtual Machines (also termed full virtualization VMs) may provide a substitute for a real machine and may provide functionality for executing entire operating systems. A hypervisor may use native execution to share and manage hardware, thus allowing for multiple environments that are isolated from one another but exist on the same physical machine. Modern hypervisors may use hardware-assisted virtualization (i.e., virtualization-specific hardware) primarily sourced from the host CPUs.

Process Virtual Machines may be designed to execute computer programs in a platform-independent environment.

One or more of virtual machines 120, 122 may be configured to utilize/maintain one or more virtual volumes (i.e., VVOLs). For example, virtual machine 120 may utilize/maintain VVOL 124 and/or virtual machine 122 utilize/maintain VVOL 126.

As is known in the art, virtual volumes may enable an administrator of a storage system to apply a policy to a virtual machine that defines various criteria (e.g., capacity limits, RAID levels, replication criteria, deduplication criteria, etc.), wherein the virtual machine and the virtual volume may be placed onto a storage system (e.g. storage system 12) that adhere to such criteria and may be utilized to store data concerning e.g., a virtual machine.

Storage Management Process:

During operation of storage system 12, various devices/systems may be added to and/or removed from storage system 12. For example, one or more processing nodes/virtual machines/virtual volumes may be added to and/or removed from storage system 12. Additionally/alternatively, data may be moved/relocated within storage system 12. Unfortunately, the addition and/or removal of such devices/systems and/or the movement of such data may adversely impact storage system 12 in unexpected ways. As will be discussed below in greater detail, storage management process 10 may be configured to analyze such changes (e.g., additions/deletions/movements) prior to their implementation and make recommendations concerning the manner in which such changes (e.g., additions/deletions/movements) should be implemented.

Figure 3:
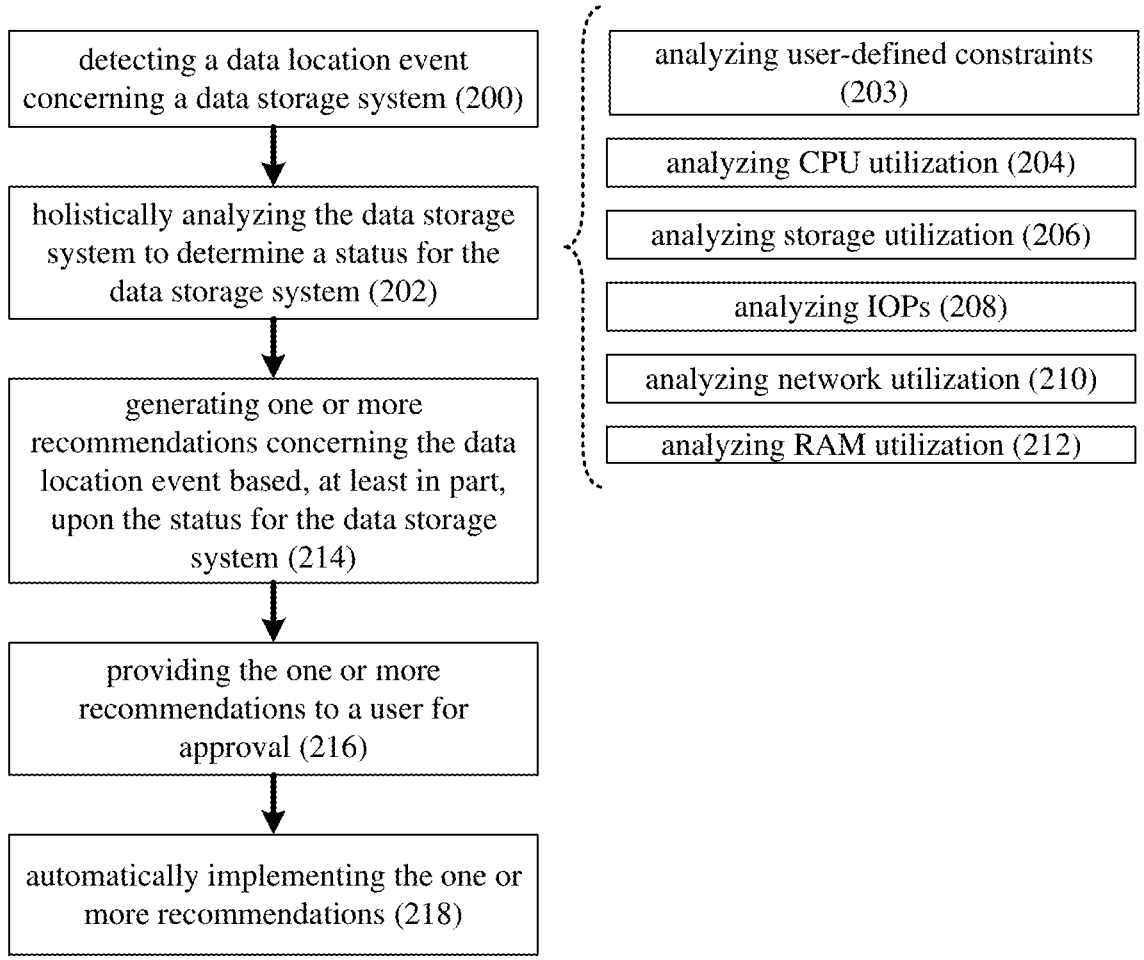
FIG. 3 is a flow chart of the storage management process of FIG. 1.

Referring also to FIG. 3, storage management process 10 may detect 200 a data location event (e.g., data location event 128) concerning a data storage system (e.g. storage system 12). The data location event (e.g., data location event 128), which may be the result of one or more of: a user request and a detected condition within the data storage system (e.g. storage system 12), may concern one or more of: a change in storage capacity within the data storage system (e.g. storage system 12); and a movement of data within the data storage system (e.g. storage system 12).

As one illustrative and non-limiting example, assume that a new employee (e.g., user 48) is starting at XYZ Corporation and a new virtual machine (e.g., VM 130) and a new virtual volume (e.g., VVOL 132) needs to be added to (i.e., defined within) storage system 12. While the process of adding a virtual machine (e.g., VM 130) and/or a virtual volume (e.g., VVOL 132) is quite simple, any adverse impacts of these additions may not be taken into account when making decisions concerning this new virtual machine (e.g., VM 130) and/or new virtual volume (e.g., VVOL 132).

As discussed above, the data location event (e.g., data location event 128) may be the result of a user request or a detected condition within the data storage system (e.g. storage system 12). For this example, assume that when onboarding user 48 into XYZ Corporation, the administrator (e.g., user 46) of storage system 12 submits a request to add a new virtual machine (e.g., VM 130) and a new virtual volume (e.g., VVOL 132) to storage system 12 for user 48.

Storage management process 10 may holistically analyze 202 the data storage system (e.g. storage system 12) to determine a status for the data storage system (e.g. storage system 12). For example and when holistically analyzing 202 the data storage system (e.g. storage system 12) to determine a status for the data storage system (e.g. storage system 12), storage management process 10 may:

Analyze 203 user-defined constraints within the storage system (e.g. storage system 12). For example, storage management process 10 may examine adherence to affinity/anti-affinity rules within storage system 12 prior to adding the new virtual machine (e.g., VM 130) and the new virtual volume (e.g., VVOL 132). Further, storage management process 10 may examine adherence to affinity/anti-affinity rules within storage system 12 with respect to one or more proposals for adding the new virtual machine (e.g., VM 130) and the new virtual volume (e.g., VVOL 132). Does the overall adherence within storage system 12 go up or go down?

Analyze 204 CPU utilization within the storage system (e.g. storage system 12). For example, storage management process 10 may examine CPU utilization within storage system 12 prior to adding the new virtual machine (e.g., VM 130) and the new virtual volume (e.g., VVOL 132). Further, storage management process 10 may examine CPU utilization within storage system 12 with respect to one or more proposals for adding the new virtual machine (e.g., VM 130) and the new virtual volume (e.g., VVOL 132). Does the overall CPU utilization within storage system 12 go up or go down? Is CPU utilization across storage system 12 more balanced or less balanced?

Analyze 206 storage utilization within the storage system (e.g. storage system 12). For example, storage management process 10 may examine storage utilization within storage system 12 prior to adding the new virtual machine (e.g., VM 130) and the new virtual volume (e.g., VVOL 132). Further, storage management process 10 may examine storage utilization within storage system 12 with respect to one or more proposals for adding the new virtual machine (e.g., VM 130) and the new virtual volume (e.g., VVOL 132). Does the storage utilization within a specific storage appliance within storage system 12 go up to an unacceptable level (thus requiring choosing another storage appliance)? Does the overall storage utilization across storage system 12 go up to an unacceptable level (thus require adding more storage capacity)?

Analyze 208 IOPs within the storage system (e.g. storage system 12). For example, storage management process 10 may examine the IOPs within storage system 12 prior to adding the new virtual machine (e.g., VM 130) and the new virtual volume (e.g., VVOL 132). Further, storage management process 10 may examine the IOPs within storage system 12 with respect to one or more proposals for adding the new virtual machine (e.g., VM 130) and the new virtual volume (e.g., VVOL 132). Do the IOPs within a specific storage appliance within storage system 12 go up to an unacceptable level (thus requiring choosing another storage appliance)? Do the IOPs across storage system 12 go up to an unacceptable level (thus require adding more compute capacity)?

Analyze 210 network utilization within the storage system (e.g. storage system 12). For example, storage management process 10 may examine the network utilization within storage system 12 prior to adding the new virtual machine (e.g., VM 130) and the new virtual volume (e.g., VVOL 132). Further, storage management process 10 may examine the network utilization within storage system 12 with respect to one or more proposals for adding the new virtual machine (e.g., VM 130) and the new virtual volume (e.g., VVOL 132). Does the network utilization within a specific storage appliance within storage system 12 go up to an unacceptable level (thus requiring choosing another storage appliance)? Does the network utilization across storage system 12 go up to an unacceptable level (thus require adding more network bandwidth capacity)?

Analyze 212 RAM utilization within the storage system (e.g. storage system 12). For example, storage management process 10 may examine the RAM utilization within storage system 12 prior to adding the new virtual machine (e.g., VM 130) and the new virtual volume (e.g., VVOL 132). Further, storage management process 10 may examine the RAM utilization within storage system 12 with respect to one or more proposals for adding the new virtual machine (e.g., VM 130) and the new virtual volume (e.g., VVOL 132). Does the RAM utilization within a specific storage appliance within storage system 12 go up to an unacceptable level (thus requiring adding more RAM to that specific storage appliance)?

Storage management process 10 may generate 214 one or more recommendations (e.g., recommendations 134) concerning the data location event (e.g., data location event 128) based, at least in part, upon the status for the data storage system (e.g. storage system 12). The one or more recommendations (e.g., recommendations 134) may concern one or more of: the location of new data within the data storage system (e.g. storage system 12); and the relocation of existing data within the data storage system (e.g. storage system 12). For example, recommendations 134 may recommend:

positioning VM 130 and VVOL 132 on processing node 100 if processing node 100 has low CPU, IOPs, Network and/or RAM utilization and low storage utilization;

positioning VM 130 and VVOL 132 on processing node 114 if processing node 114 has low CPU, IOPs, Network and/or RAM utilization and low storage utilization; and positioning VM 130 on processing node 100 if processing node 100 has low CPU, IOPs, Network and/or RAM utilization and positioning VVOL 132 on processing node 114 if processing node 114 has low storage utilization.

Storage management process 10 may provide 216 the one or more recommendations (e.g., recommendations 134) to a user (e.g., user 46) for approval. For example, storage management process 10 may provide a notification to user 46 that says "In response to your request, we recommend positioning VM 130 and VVOL 132 on processing node 100, as processing node 100 has lower CPU, IOPs, Network, RAM and storage utilization than processing node 114. Do you approve this plan?" In the event that e.g., user 46 approves this proposal, storage management process 10 may implement the process of positioning VM 130 and VVOL 132 on processing node 100.

Conversely, storage management process 10 may automatically implement 218 the one or more recommendations (e.g., recommendations 134). For example, storage management process 10 may automatically implement the process of positioning VM 130 and VVOL 132 on processing node 100 and may provide a notification to user 46 that says "In response to your request, we positioned VM 130 and VVOL 132 on processing node 100, as processing node 100 has lower CPU, IOPs, Network, RAM and storage utilization than processing node 114."

As these recommendations (e.g., recommendations 134) may be temporally fleeting, storage management process 10 may provide 216 the one or more recommendations (e.g., recommendations 134) to a user (e.g., user 46) and may automatically implement 218 the one or more recommendations (e.g., recommendations 134) unless the user vetoes the plan within a defined period of time. For example, storage management process 10 may provide a notification to user 46 that says "In response to your request, we will position VM 130 and VVOL 132 on processing node 100, as processing node 100 has lower CPU, IOPs, Network, RAM and storage utilization than processing node 114, unless you instruct us not to in the next 30 minutes." In the event that e.g., user 46 fails to disapprove this proposal within 30 minutes, storage management process 10 may implement the process of positioning VM 130 and VVOL 132 on processing node 100.

While the above-described analysis methodology concerns the addition of a virtual machine (e.g., VM 130) and a new virtual volume (e.g., VVOL 132) to storage platform 12, this is for illustrative purposes only and is not intended to be a limitation of this disclosure as other configurations are possible and are considered to be within the scope of this disclosure. For example, the above-described analysis methodology may concern numerous other events, examples of which may include but are not limited to: the adding or removing of a physical storage device in a storage appliance; the adding or removing of a storage appliance within storage system 12; the movement of a virtual volume from a first virtual machine to a second virtual machine; the movement of a virtual machine from a first storage appliance to a second storage appliance; the migration of data between physical storage devices; the migration of data between virtual volumes; and/or the migration of data between virtual machines.

As discussed above, the data location event (e.g., data location event 128) may be the result of a user request or a detected condition within the data storage system (e.g. storage system 12). Accordingly and while the above-described analysis methodology concerns a data location event (e.g., data location event 128) being based upon a request received from a client, this is for illustrative purposes only and is not intended to be a limitation of this disclosure, as other configurations are possible and are considered to be within the scope of the disclosure. For example, storage management process 10 may be configured to proactively monitor storage system 12 by e.g., monitoring CPU, IOPs, Network, RAM and storage utilization. And in the event that storage management process 10 detects e.g., one or more of these levels of utilizations exceeds a defined threshold, the data location event (e.g., data location event 128) may be automatically generated, thus initiating the above-described process.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
  detecting a data location event concerning a data storage system, wherein the data location event is the result of a user request, wherein the user request includes a request to add a new virtual machine and a new virtual volume to the data storage system for the user;
  analyzing the data storage system to determine a status for the data storage system, wherein analyzing the data storage system to determine the status for the data storage system includes analyzing input/output operations per second (IOPs), wherein analyzing the IOPs includes:
    examining the IOPs within the data storage system prior to adding the new virtual machine and the new virtual volume, and
    examining the IOPs within the data storage system respective to the one or more requests for adding the new virtual machine and the new virtual volume,
  wherein analyzing the data storage system to determine the status for the data storage system includes analyzing Random Access Memory (RAM) utilization, wherein analyzing the RAM utilization includes:
    examining the RAM utilization within the data storage system prior to adding the new virtual machine and the new virtual volume, and
    examining the RAM utilization within the data storage system respective to the one or more requests for adding the new virtual machine and the new virtual volume; and
  generating one or more recommendations concerning the data location event based, at least in part, upon the status for the data storage system, wherein the one or more recommendations concern:
    a location of new data within the data storage system, including a recommendation to position the new virtual machine and the new virtual volume on a first processing node having a lower CPU utilization, IOPs, Network utilization, RAM utilization, and storage utilization than a second processing node, and
    a relocation of existing data within the data storage system, including a recommendation to position the new virtual machine on the first processing node and to position the new virtual volume on a processing node with a lower storage utilization than the first processing node and the second processing node, wherein the processing node with the lower storage utilization includes storage space created by the relocating of the existing data.

2. The computer-implemented method of claim 1 further comprising:
  providing the one or more recommendations to a user for approval.

3. The computer-implemented method of claim 1 further comprising:
  automatically implementing the one or more recommendations.

4. The computer-implemented method of claim 1 wherein the data location event is the result of a detected condition within the data storage system.

5. The computer-implemented method of claim 1 wherein the data location event concerns one or more of:
  a change in storage capacity within the data storage system; and
  a movement of data within the data storage system.

6. The computer-implemented method of claim 1 wherein analyzing the data storage system to determine a status for the data storage system includes one or more of:
  analyzing user-defined constraints;
  analyzing CPU utilization;
  analyzing storage utilization; and
  analyzing network utilization.

7. The computer-implemented method of claim 6 wherein analyzing the user-defined constraints includes:
  examining adherence to affinity and anti-affinity rules within the data storage system prior to adding the new virtual machine and the new virtual volume to the data storage system.

8. The computer-implemented method of claim 6 wherein analyzing the user-defined constraints includes:
  examining adherence to affinity and anti-affinity rules within the data storage system respective to one or more proposals for adding the new virtual machine and the new virtual volume to the data storage system.

9. A computer program product residing on a non-transitory computer readable medium having a plurality of instructions stored thereon which, when executed by a processor, cause the processor to perform operations comprising:
  detecting a data location event concerning a data storage system, wherein the data location event is the result of a user request, wherein the user request includes a request to add a new virtual machine and a new virtual volume to the data storage system for the user;
  analyzing the data storage system to determine a status for the data storage system, wherein analyzing the data storage system to determine the status for the data storage system includes analyzing input/output operations per second (IOPs), wherein analyzing the IOPs includes:
    examining the IOPs within the data storage system prior to adding the new virtual machine and the new virtual volume, and
    examining the IOPs within the data storage system respective to the one or more requests for adding the new virtual machine and the new virtual volume,
  wherein analyzing the data storage system to determine the status for the data storage system includes analyzing Random Access Memory (RAM) utilization, wherein analyzing the RAM utilization includes:
    examining the RAM utilization within the data storage system prior to adding the new virtual machine and the new virtual volume, and
    examining the RAM utilization within the data storage system respective to the one or more requests for adding the new virtual machine and the new virtual volume; and
  generating one or more recommendations concerning the data location event based, at least in part, upon the status for the data storage system, wherein the one or more recommendations concern:
    a location of new data within the data storage system, including a recommendation to position the new virtual machine and the new virtual volume on a first processing node having a lower CPU utilization, IOPs, Network utilization, RAM utilization, and storage utilization than a second processing node, and
    a relocation of existing data within the data storage system, including a recommendation to position the new virtual machine on the first processing node and to position the new virtual volume on a processing node with a lower storage utilization than the first processing node and the second processing node, wherein the processing node with the lower storage utilization includes storage space created by the relocating of the existing data.

10. The computer program product of claim 9 further comprising:
  providing the one or more recommendations to a user for approval.

11. The computer program product of claim 9 further comprising:
  automatically implementing the one or more recommendations.

12. The computer program product of claim 9 wherein the data location event is the result of a detected condition within the data storage system.

13. The computer program product of claim 9 wherein the data location event concerns one or more of:
  a change in storage capacity within the data storage system; and
  a movement of data within the data storage system.

14. The computer program product of claim 9 wherein analyzing the data storage system to determine a status for the data storage system includes one or more of:
  analyzing user-defined constraints;
  analyzing CPU utilization;
  analyzing storage utilization; and
  analyzing network utilization.

15. A computing system including a processor and memory configured to perform operations comprising:
  detecting a data location event concerning a data storage system, wherein the data location event is the result of a user request, wherein the user request includes a request to add a new virtual machine and a new virtual volume to the data storage system for the user;
  analyzing the data storage system to determine a status for the data storage system, wherein analyzing the data storage system to determine the status for the data storage system includes analyzing input/output operations per second (IOPs), wherein analyzing the IOPs includes:
    examining the IOPs within the data storage system prior to adding the new virtual machine and the new virtual volume, and
    examining the IOPs within the data storage system respective to the one or more requests for adding the new virtual machine and the new virtual volume,
  wherein analyzing the data storage system to determine the status for the data storage system includes analyzing Random Access Memory (RAM) utilization, wherein analyzing the RAM utilization includes:
    examining the RAM utilization within the data storage system prior to adding the new virtual machine and the new virtual volume, and
    examining the RAM utilization within the data storage system respective to the one or more requests for adding the new virtual machine and the new virtual volume; and
  generating one or more recommendations concerning the data location event based, at least in part, upon the status for the data storage system, wherein the one or more recommendations concern:
    a location of new data within the data storage system, including a recommendation to position the new virtual machine and the new virtual volume on a first processing node having a lower CPU utilization, IOPs, Network utilization, RAM utilization, and storage utilization than a second processing node, and
    a relocation of existing data within the data storage system, including a recommendation to position the new virtual machine on the first processing node and to position the new virtual volume on a processing node with a lower storage utilization than the first processing node and the second processing node, wherein the processing node with the lower storage utilization includes storage space created by the relocating of the existing data.

16. The computing system of claim 15 further comprising:
  providing the one or more recommendations to a user for approval.

17. The computing system of claim 15 further comprising:
    automatically implementing the one or more recommendations.

18. The computing system of claim 15 wherein the data location event is the result of a detected condition within the data storage system.

19. The computing system of claim 15 wherein the data location event concerns one or more of:
    a change in storage capacity within the data storage system; and
    a movement of data within the data storage system.

20. The computing system of claim 15 wherein analyzing the data storage system to determine a status for the data storage system includes one or more of:
    analyzing user-defined constraints;
    analyzing CPU utilization;
    analyzing storage utilization; and
    analyzing network utilization.

\* \* \* \* \*